Feb. 23, 1954

H. E. McKINNEY 2,670,225

LUBRICATOR DEVICE

Filed Sept. 2, 1950

Inventor:
Howard E. McKinney
By *[signature]*
His Attorney

Patented Feb. 23, 1954

2,670,225

UNITED STATES PATENT OFFICE 2,670,225

LUBRICATOR DEVICE

Howard E. McKinney, Bellaire, Tex., assignor to Shell Development Company, San Francisco, Calif., a corporation of Delaware Application September 2, 1950, Serial No. 182,970

7 Claims. (Cl. 286—16)

This invention relates to an apparatus through which lengths of cable, wire line, macaroni tubing, etc. may be inserted into and removed from a well casing or tubing of a well under pressure. It is, however, understood that the invention is in no way limited to use in high-pressure wells, but may also be used when inserting temperature and pressure bulbs, or similar instruments, into pressure vessels such, for example, as towers in oil refineries, etc.

Since wire lines and cables of types such as are used in well head operations, for example, insulated conductor cables having an armor sheath made of wire strands, have a relatively rough or uneven surface, an excessive radial pressure must be normally applied by any lubricator or packing element when such cable is being inserted into a high pressure well to prevent pressure leaks between the packing element and the cable. In fact, before a completely fluidtight seal is formed about the cable, this radial pressure must often reach such an order of magnitude that the cable becomes jammed in the packer, thus preventing a vertical movement of the cable and defeating the purpose of operation of the lubricator.

In general, the lubricators presently employed on high-pressure wells are provided with a rubber packer which is adapted to form a solid-to-solid seal around a cable having a rough or a grooved surface. Because of this solid-to-solid seal between the cable and the rubber packer, the latter is subjected to excessive abrasive action when cables of hundreds or thousands of feet in length are rapidly drawn therethrough. This necessitates frequent replacement or readjustment of the rubber packers in order to seal the top of the well effectively.

It is therefore a primary object of this invention to provide an apparatus through which either smooth or rough-surfaced cable, wire line, small-diameter tubing or equivalent elongated cylindrical elements may be readily inserted into a high-pressure well.

It is also an object of the present invention to provide a lubricator adapted to form an effective seal about a cable being inserted into or withdrawn from a high-pressure well, said seal being of a liquid-to-solid type, thereby eliminating the possibility of any abrasive action between the moving cable and the seal.

Other objects and advantages of the invention will become apparent from the following description taken with reference to the drawing wherein.

Figures 1, 2:
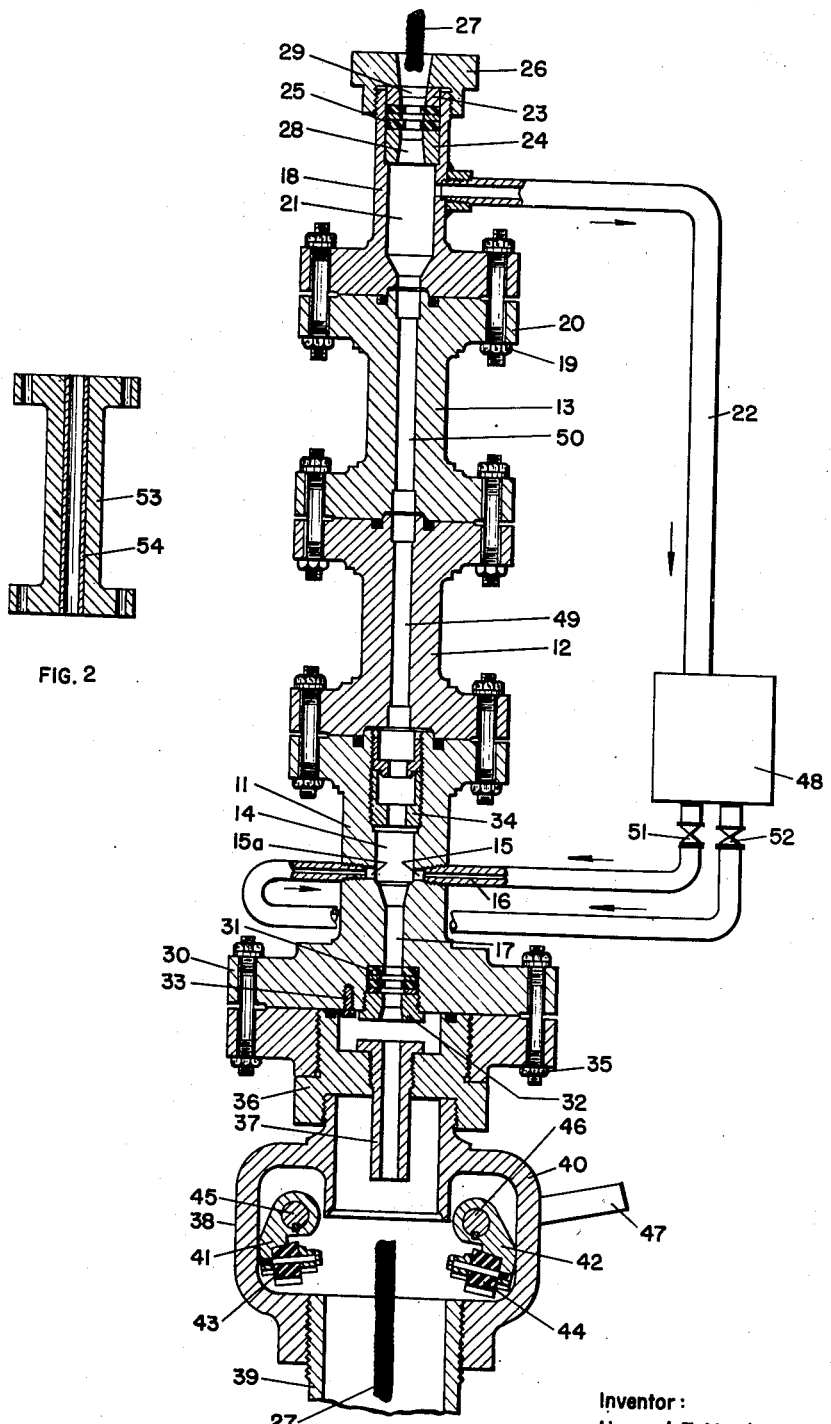
Figure 1 is a longitudinal view in cross section of the present lubricator device.
Figure 2 is a longitudinal view in cross section of another embodiment of a spool piece used in the present lubricator device.

Referring to Figure 1, the main portion of the present lubricator device comprises a tubular element which is preferably constructed in the form of a plurality of short sections or spool pieces 11, 12 and 13, which may be secured together in a fluidtight manner by any suitable means such as, for example, screw threads, flanges, etc. The bore of the lower pipe section 11 is enlarged along a portion thereof forming a fluid reservoir 14 containing a relatively viscous transfer liquid or sealing material such as heavy oil or grease. Waxes, asphalt, glue, sugar syrup, paraffin, water, drilling muds, or any viscid material may be used as pressure fluids.

The pipe section 11 is provided with one or more suitable ports 15 and 15a through the wall thereof in communication with the reservoir 14. A conduit 16 is threadedly secured in port 15 for supplying a liquid, preferably a viscous medium under pressure to said reservoir 14 from any suitable source, diagrammatically shown at 48, which consists of a supply of the viscous medium together with a source of pressure for injecting said viscous medium. The source of injection pressure may comprise the utilization of the well casing pressure in a manner well known to the art, or the employment of a compressor such as an air-operated high pressure power gun. Preferably, separate conduits 16 and 16a are in communication between the source of the viscous medium 48 and the ports 15 and 15a, the flow through said conduits being controlled by valves 51 and 52. The portion of the bore 17 below the reservoir 14 in the lower pipe section 11 is equal in diameter to the bore in the other two pipe sections 12 and 13, said diameter being slightly (a few thousandths of an inch) greater than the diameter of a cable 27 to be fed through said bores.

A short spool of pipe section 18 is secured by means of bolts 19 to the top flange 20 of pipe section 13. The bore of this pipe section 18 is recessed to provide a chamber 21, substantially equal in size to reservoir 14, in which the transfer liquid or sealing material may be collected. A conduit 22 may communicate between the chamber 21 and the supply of the viscous fluid in unit 48 for returning excess transfer fluid thereto. A pair of holding sleeves 23 and 24 are positioned in the bore of the top pipe section 18 for holding therebetween one or more cable wipers 25, which are preferably made of a resilient material such as rubber. The sleeves 23 and 24 may be threadedly secured in the bore of section 18 or they may be fixedly held therein by a threaded cap 26. The cap 26, sleeves 23 and 24, and cable wipers are all provided with axial bores through which the cable 27 may be fed. Preferably, the bores 28 and 29 of the sleeves 23 and 24 are tapered as shown to act as centering guides for the cable at the upper end of the apparatus.

Similarly, the lower flange 30 of pipe section 11 is recessed around the bore to receive in said recess one or more rubber cable wipers 31 secured in place by a threaded sleeve 32 provided with a lock screw 33. Preferably, the present apparatus is provided with a plurality of gas flow resistance orifices 34 positioned in the bore of pipe section 11 above the liquid reservoir 14 and/or in the bore 49, and/or in the bore 50. These orifices assist in cutting down the flow of gas in the event that a gas flow should occur through the apparatus.

While the lower flange 30 of pipe section 11 may be secured directly to a wellhead, or to a christmas tree positioned thereon, it is preferably secured by bolts 35 to a flanged member 36 provided with a tubular centering guide 37 for centering the cable 27 in the bore 17 and the wire-line valve or blow-out preventer 38. Also a pressure-seal wire line valve or blow-out preventer 38 is preferably secured between member 36 and a tubular member 39 on the wellhead for providing extra security against blow-outs. The preventer 38 comprises a pressuretight housing 40 in which a pair of rams 41 and 42 carrying sealing rubbers 43 and 44 are swingingly mounted on shafts 45 and 46 which may be actuated by a handle 47. In operation the rams 41 and 42 rotate toward each other and the rubbers 43 and 44 seal against the wire line 27.

The present apparatus is especially designed for effectively sealing the top of a high-pressure (say, 6000 p. s. i.) well as tools or instruments are run into the well on a cable, particularly when the cable has a rough or a grooved surface. As the cable 27 is inserted into or withdrawn from the well, a pressure or transfer liquid or material such as a grease is pumped from the pressure source through conduit 16 and/or 16a into the reservoir 14 where it entirely surrounds the cable 27 and fills the grooves in the surface thereof. Normally, sufficient quantities of the viscous material under pressure may be supplied to the reservoir 14 through a single conduit 16 or 16a. However, in the event of a sudden increase in well pressure which might cause a blow-out, both valves 51 and 52 may be opened to increase the amount and pressure of the grease being supplied to the reservoir 14.

The transfer fluid is supplied to the reservoir 14 at a pressure slightly greater than the well pressure so that a low differential pressure seal is formed between the cable 27 and the walls of the bore 17 in the lower pipe section 11. Since the clearance between the walls of the bore 17 and the cable 27 may be in the order of .001-.005 inch, the well pressure cannot force the grease out and an effective solid-liquid-solid seal is formed within the bore of the apparatus in each of the sections 11, 12 and 13. Above the fluid reservoir 14, the bores or orifices 49 and 50 through the upper pipe sections 12 and 13 form a high differential pressure seal about the cable 27. Hence, there is a greater tendency for the sealing fluid to be forced along the orifices 49 and 50 to the fluid collection chamber 21, especially when the cable 27 is being withdrawn from the well. Transfer fluid collected in chamber 21 can be returned to the pressure source 48 through conduit 22. The cable wipers 25 and 31 do substantially no sealing but merely wipe off excess transfer fluid or other material carried on the surface of the cable 27. For sustained and economical operation, the length of the orifices 49 and 50 should be at least 10 times the diameter thereof.

Thus, it may be seen that the present apparatus provides means for sealing, in a high-pressure well, a cable or any cross-section, i. e., round, square, octagonal or any irregular shape. Additionally, the seal formed is not subject to any wear due to abrasive action between solid moving bodies as the transfer fluid forming the seal prevents any solid-to-solid contact. Depending upon the well pressure encountered, the passageway formed by the bores of pipe sections 11, 12, and 13 may be readily varied in length and diameter by the proper selection of spools of suitable size in order to accommodate cables of varying diameter in the well installation.

A preferred embodiment of the spool pieces of the present device is shown in Figure 2 wherein the spool piece 53 has inserted in its bore a cylindrical sleeve 54. In the event that the inner wall of the sleeve 54 becomes eroded or gas-cut, the sleeve rather than the entire spool may be readily replaced at comparatively little cost. This cylindrical sleeve (Fig. 2) can be of the longitudinally split type to permit replacement while apparatus is under pressure and the cable 27 is in the bore 17, 14, 49, 50, etc.

When a cable is being inserted into a high-pressure well, the present lubricator or sealing apparatus may be used in conjunction with any suitable cable feeding mechanism, for example, the one disclosed in U. S. Patent application No. 84,076 to McKinney, filed March 29, 1949, or U. S. Patent No. 2,262,364 to Hügel, issued November 11, 1941. The present lubricator device has been found to form an effective seal around a cable being injected into a high-pressure (in the range of 2,000-10,000 p. s. i.) well whereby various well instruments and tools such as depth gauges, pressure gauges, borehole calipers, casing perforators, bailers, fishing tools, casing cutters, flow meters, samplers and radioactive logging equipment may be readily lowered into the well on a cable or wire line.

I claim as my invention:

1. An apparatus for forming a pressure seal around a columnar element during insertion into and removal from a high-pressure wellhead, said apparatus comprising a plurality of spool members, means connecting said spool members end to end to each other in fluidtight manner, means mounting the lowermost spool member on top of the wellhead coaxially therewith, an axial bore through said spool members in communication with the wellhead, the diameter of said bore being barely larger than the diameter of said columnar element, said bore in the uppermost spool member and in the upper portion of the lowermost spool member being enlarged to form an upper and a lower pressure fluid chamber respectively, a plurality of axial gas flow resistance orifices mounted in the upper portion of the lower chamber, means comprising radial port means opening to the lower chamber below said axial resistance orifices for injecting a viscous pressure fluid into said lower chamber, and means comprising radial port means opening to the upper chamber for withdrawing said fluid therefrom.

2. An apparatus for forming a pressure seal around a relatively flexible cable during insertion into and removal from a high-pressure wellhead, said apparatus comprising a plurality of spool members, means connecting said spool members end to end to each other in fluidtight manner, means mounting the lowermost spool member on top of the wellhead coaxially therewith, an axial bore through said spool members in communication with the wellhead, the diameter of the bore being barely larger than the diameter of said cable, said bore in the uppermost spool member and in the upper portion of the lowermost spool member being enlarged to form an upper and a lower pressure fluid chamber respectively, a plurality of axial gas flow resistance orifices mounted in the upper portion of the lower chamber, means comprising a plurality of radial inlet ports opening to the lower chamber below said axial resistance orifices for injecting a viscous pressure fluid into said lower chamber, means comprising outlet port means opening to the upper chamber for withdrawing said fluid therefrom, a source of pressure fluid, conduit means in communication between each of said inlet ports and said pressure source, and valves in said conduit means for controlling the pressure and amount of viscous fluid introduced to said lower chamber.

3. An apparatus for forming a pressure seal around a relatively flexible cable during insertion into and removal from a high-pressure wellhead, said apparatus comprising a plurality of spool members, means connecting said spool members end to end to each other in fluidtight manner, means mounting the lowermost spool member on top of the wellhead coaxially therewith, an axial bore through said spool members in communication with the wellhead, a sleeve removably mounted in the bore of each of said spool members, the inside diameter of said sleeves being barely larger than the diameter of said cable, said bore in the uppermost spool member and in the upper portion of the lowermost spool member being enlarged to form an upper and a lower pressure fluid chamber respectively, cable wipers mounted at the upper end of the uppermost spool piece and at the lower end of the lowermost spool piece in coaxial alignment with the bore therethrough, a plurality of axial gas flow resistance orifices mounted in the upper portion of the lower chamber, means comprising a plurality of radial inlet ports opening to the lower chamber below said axial resistance orifices for injecting a viscous pressure fluid into said lower chamber, means comprising outlet port means opening to the upper chamber for withdrawing said fluid therefrom, a source of pressure fluid, conduit means in communication between each of said inlet ports and said pressure source, and valves in said inlet conduit means for controlling the pressure and amount of viscous fluid introduced to said lower chamber.

4. An apparatus for forming a pressure seal around a relatively flexible cable during insertion into and removal from a high-pressure wellhead, said apparatus comprising a plurality of spool members, means connecting said spool members end to end to each other in fluidtight manner, blow-out preventer means secured to the lowermost spool member, cable centering means carried by said blow-out preventer means, means mounting the blow-out preventer means on top of the wellhead coaxially therewith, an axial bore through said spool members in communication with the wellhead, the diameter of the bore being barely larger than the diameter of said cable, said bore in the uppermost spool member and in the upper portion of the lowermost spool member being enlarged to form an upper and a lower pressure fluid chamber respectively, a plurality of axial gas flow resistance orifices mounted in the upper portion of the lower chamber, means comprising a plurality of radial inlet ports opening to the lower chamber below said axial resistance orifices for injecting a viscous pressure fluid into said lower chamber, means comprising outlet port means opening to the upper chamber for withdrawing said fluid therefrom, a source of pressure fluid, conduit means in communication between each of said inlet ports and said pressure source, and valves in said inlet conduits for controlling the pressure and amount of viscous fluid introduced to said lower chamber.

5. An apparatus for forming a pressure seal around a cable being inserted into a high-pressure wellhead, said apparatus comprising an elongated tubular member adapted to be mounted on the top of the wellhead coaxially and in open communication therewith, the major length of said tubular member having a substantially smooth continuous bore slightly greater in diameter than the cable passing therethrough, means for removably securing said member to said wellhead in a fluidtight manner, the bore of said tubular member having short portions near the ends thereof enlarged to form first and second liquid chambers, said first chamber being positioned substantially adjacent the wellhead, conduit means for introducing a pressure-liquid through the wall of said tubular member to said first chamber, second conduit means for discharging said pressure-liquid from said second chamber, a source of pressure-fluid connected to said first conduit means, a plurality of axially disposed gas flow resistance orifices mounted within an enlarged portion of the bore of said tubular member, and non-metallic cable wipers secured to either end of said tubular member in coaxial alignment with the bore thereof, said cable wipers having a bore therethrough of a diameter smaller than the cable passing therethrough.

6. An apparatus for forming a pressure seal around a cable being inserted into a high-pressure wellhead, said apparatus comprising an elongated tubular member adapted to be mounted on the top of the wellhead coaxially and in open communication therewith, the major portion of the bore of tubular member being slightly greater in diameter than that of the cable passing therethrough, means for removably securing said member to said wellhead in fluidtight manner, the bore of said tubular member having short portions near the ends thereof enlarged to form first and second liquid chambers, said first chamber being positioned substantially adjacent the wellhead, conduit means for introducing a viscous pressure-liquid through the wall of said tubular member to said first chamber, second conduit means for discharging said viscous pressure-liquid from said second chamber, a source of viscous pressure-fluid connected to said first conduit means, cable wipers secured to either end of said tubular member in coaxial alignment with the bore thereof, and a plurality of axially disposed gas flow resistance orifices mounted within the bore of said tubular member.

7. An apparatus for forming a pressure seal around a cable being inserted into a high-pressure wellhead, said apparatus comprising an elongated tubular member adapted to be mounted on the top of the wellhead coaxially and in open communication therewith, the major portion of the bore of tubular member being slightly greater in diameter than the cable passing therethrough, the bore of said tubular member having short portions near the ends thereof enlarged to form first and second liquid chambers, said first chamber being positioned substantially adjacent the wellhead, conduit means for introducing a viscous pressure-liquid through the wall of said tubular member to said first chamber, second conduit means for discharging said viscous pressure-liquid from said second chamber, a source of viscous pressure-fluid connected to said first conduit means, and a plurality of axially disposed gas flow resistance orifices mounted within an enlarged portion of the bore of said tubular member.

HOWARD E. McKINNEY.

References Cited in the file of this patent

UNITED STATES PATENTS

| Number | Name | Date |
|---|---|---|
| 1,572,394 | Krebs | Feb. 9, 1926 |
| 1,595,481 | Minton | Aug. 10, 1926 |
| 2,069,087 | Forstrom et al. | Jan. 26, 1937 |
| 2,332,150 | Huff | Oct. 19, 1943 |
| 2,446,620 | Swallow et al. | Aug. 10, 1948 |
| 2,517,655 | Gillespie | Aug. 8, 1950 |